Oct. 10, 1933.   D. F. McCORMICK   1,930,247
METHOD OF TREATING CLAY
Filed May 12, 1931
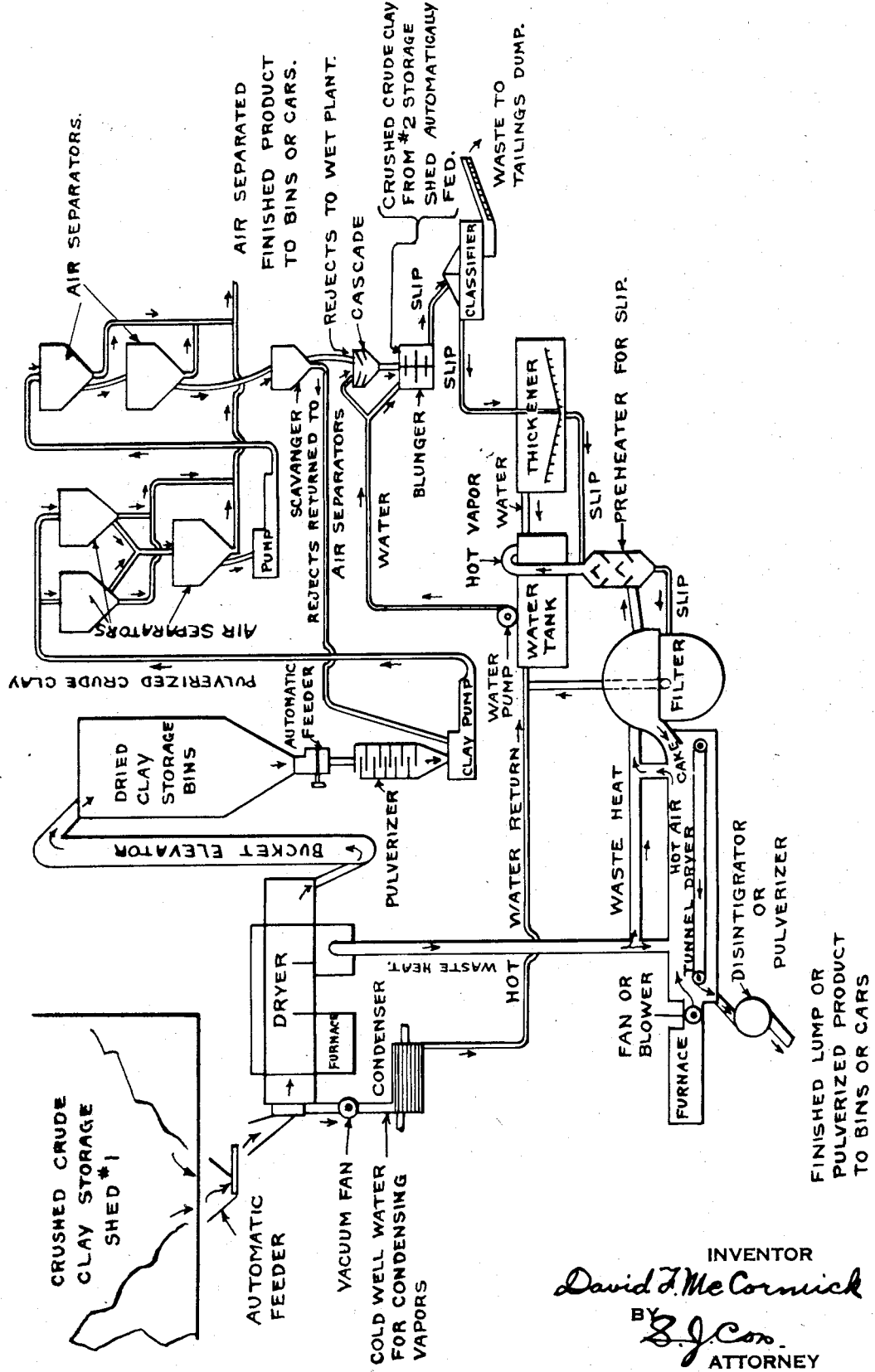
INVENTOR
David F. McCormick
BY S. J. Cox
ATTORNEY Patented Oct. 10, 1933

1,930,247

UNITED STATES PATENT OFFICE 1,930,247

METHOD OF TREATING CLAY

David F. McCormick, Staunton, Va., assignor to Kaolin Processes Inc., Elizabeth, N. J., a corporation of New Jersey Application May 12, 1931. Serial No. 536,955

21 Claims. (Cl. 209—2)

The invention relates to the refining treatment of clay, or in other words, the separation of the pure kaolin from impurities invariably present in the natural product, so as to produce a clay free from such impurities, in an economical and efficient manner and without wasting any of the fine clay by having it carried off with the impurities.

The method or process may be defined generally as a combined and continuous dry and wet treatment, so carried on and synchronized in all its steps and so regulated as to the speed and capacity of each partial treatment that approximately 100 per cent. of the fine clay may be separated and recovered, rapidly and efficiently, and the operation of each sub treatment or step permitted to proceed at normal speed and without retardation or interruption.

The accompanying drawing is a diagrammatic flow sheet showing an arrangement of apparatus, conduits and other instrumentalities by which the method or process herein described and claimed may be carried out and practiced, with arrows indicating the movement and flow of the solid, fluid and semi-solid substances and materials therein, and descriptive matter indicating the character of such instrumentalities and also the character and condition of such substances and materials at various stages.

The dry treatment

The dry treatment of kaolin or clay for marketing as a filler in the manufacture of paper, rubber and other products, as well as for ceramic purposes, is an old procedure and the air separation method has long been used in this and other industries where dust or other fine, relatively light substances are to be separated from heavier. Various combinations of standard machines have been used from time to time with the object of obtaining a clean marketable product with the least waste of marketable material in the rejects, at the lowest cost for power, labor and other plant elements and with the simplest and most efficient plant arrangement. Special machines based on the difference in specific gravity of clay dust and other particles, or relative centrifugence, or some other mechanical feature, or a combination of several of such properties, have also been designed and used in the process of air separation. The air separation method requires a thoroughly dried and carefully pulverized material for correct separation and sizing and classification of material saved. As the various schemes were developed at the separation end of the process, improvements were made in grinding and drying equipment.

Although substantially the same flow sheet is necessary in each case to prepare the clay in a dry powdered form for the separating or classifying unit any one of several types of machines may be used to accomplish the result. Most of the machines have long been used for this purpose, and the process used has been essentially the same for many years. Briefly the various steps followed and their sequence have been as follows: Stripping of overburden, mining of clay, drying—by air or sun as much as possible, then by mechanical means—pulverizing, and finally air separation, though sometimes screening was substituted for or preceded the air separation. Fine screening of dry materials is still a slow and costly method of classification, but it is positive and gives a clean product of desired size. However, it has the serious objection in the classification of clays that all particles of any given size, or smaller, will pass through the screens if smaller than the size of mesh used for screening. The heavier particles also go through quickest. Therefore, where the clays contain small crystals or pieces of minerals (usually heavier than clay) such as pyrite or ilmenite or graphite or quartz, etc., all extremely objectionable, because of discoloring properties, abrasiveness or unequal melting properties, etc., the screens are useless insofar as rejecting these undesirable foreign materials is concerned.

The Gayco air separator (see Patent No. 1,457,110 of May 29, 1923) combines a mechanical and also the specific gravity principle of separation and the finished product as an air floated product does not contain the heavier minerals even though smaller in particle size than the fine clay or "fines". Air separation is less expensive than screening, but it is not so thorough and the process, unless carried on over and over in a series of air separators is wasteful of the fine clay, because from 15 to 45% of the clay (equal to and similar to the finished product) is carried over into the rejects, and repetition of the treatment beyond a certain point is too wasteful of power and other plant operation costs. It was because of this fact that a combination of the dry and the wet process in one continuous synchronized operation was worked out by me as an economical solution of the clay separation problem.

Heretofore either one or the other of the two schemes has been used, and the enormous waste of perfectly good clay has been suffered as an economic loss. If an effort was made to market—often at a loss—the rejects as an inferior grade of product suitable only in competition with cheap substitutes—often available locally in or near to manufacturing districts at very low prices—the result was usually a financial failure. High freight rates prohibited the sale of rejects. The cost of preparing clay for an ever improving standard was high and the waste of the raw material as rejects was enormous in both dry and wet processes. Perfectly good clay on which the cost of stripping, mining and much of the milling cost and handling charges were already spent was sent to the waste dumps. If this clay could be saved economically it is apparent that the cost of producing clay could be materially reduced.

The present method preferably employs the Gayco or similar machines for air separation on the dry plant side, also a cage mill of the Ross or Stedman type, in which the clay is beaten rather than crushed, for pulverizing or disintegrating, rather than other types of pulverizers. Since the Gayco separator operates best on a practically bone dry clay, which has the clay as fine as possible and the grit or foreign particles as coarse as possible, the cage mill is best adapted for this purpose, because it does not tend to grind, crush or smash the particles, but simply to separate them each in its own original size. To dry the clay, a rotary type dryer of the vacuum type is preferred because the clay when subjected to high dry heats is easily discolored and calcined. This decolorization or any change in physical or chemical properties ruins it for the principal purpose for which it is intended. Therefore a standard B. V. type Christie indirect heat dryer is efficient, and well suited for this purpose. The cage mills and Gayco separators are well known and have been extensively used with clay and other minerals for many years, and therefore need no further description. Their operation in regulating and controlling the disintegration of the clay so that the grit and other impurities are not crushed, and in selecting and carrying off the fine clay particles or "fines" after separating them from these impurities, however fine, has also long been understood and utilized. Their speed and operating efficiency as to degree of disintegration and percentage of fine clay separation per treatment can also be regulated within rather wide limits. A further description of their construction, operation and control is therefore unnecessary.

A full and clear description of the process and the instrumentalities which may be employed in carrying it out can be best given by starting at the beginning and following the flow sheet through to the end.

In lieu of the old hand method of mining—usually adopted—because of the necessity and the ease in making fairly uniform sized chunks for hand handling for the now discarded air drying on wooden racks in dryer sheds—power shovel mining is adopted and the clay is dumped into a hopper from which it is fed mechanically at a uniform rate to the ordinary crusher roll type of disintegrator. An elevator lifts the crushed clay to a distributor belt so arranged in the storage shed that the clay can be scraped off at any given point and allowed to fall onto the stock pile as selected. A collector belt is located in a tunnel below the storage shed floor, and it is fed by a mechanical feeder that keeps an even flow of clay to the rotary dryers. It is best to have the clay in fairly small chunks when fed to the dryer, therefore a second set of rolls should be provided for this purpose. In order to allow a certain flexibility in the operations, and for the purpose of storage, the dried clay is elevated to bins from the rotary dryer. To maintain a vacuum in the rotary dryer, screw type or butterfly type valves are used in the feed and discharge ends. An adjustable mechanical feeder provides an even stream of clay to the cage mills for pulverizing at maximum capacity without choking the mills, and also provides the even stream of clay necessary to be fed to the air separators so that the machines will perform at their maximum capacity and efficiency under a given condition. To provide a clean, positive uniform elevating unit capable of delivering the pulverized dry clay to any one of several air separators and afterwards to storage bins, or to railroad cars direct for shipment to consumer, as selected, and at will, and to be able to conduct this clay around curves into these several places, a pump system of the Fuller Kinyon type is installed. This is a valuable adjunct in the handling equipment of the clay processing plant.

The dry-wet treatment

Since the air separators are not very efficient—leaving from 15 to 60% of the clay as rejects—it was found necessary to line up several machines in series and to take a clean pure product from each machine; but, to retreat the rejects from the first machine in a second machine and the rejects from the second machine in a third, etc., soon becomes top heavy in capital charges, and makes plant investment prohibitive. At a certain point in the series there is a critical stage where it is possible to use one air separator—usually of a similar size—as a "scavenger". This scavenger simply divides the rejects from the series of machines ahead of it, and retains in the dry cycle a product regulated to contain only about as much grit as the original feed to the first air separator. Naturally the rejects from this scavenger will still carry considerable, perfectly good, marketable, clay, if they are "cleaned up", and since it is impractical to continue the air separation, the combination of a coordinated wet and dry process for treating clays and thereby saving the remainder of the marketable clay and rejects, so as to waste only the grit and foreign minerals and materials not desirable in the clay, was devised. In this process the product from the scavenger operation is returned to the original stream of clay fed to the first air separators, and to the rejects from the scavenger there is added sufficient water to make a "slip" which is passed to the wet process for additional treatment. It was discovered that of this reject material when classified and treated by the wet process the settling and filtering units would handle about 100 per cent. more clay than was possible with a straight crude clay prepared directly from the mine into a slip for treatment. It was also discovered that this same increase in capacity could be maintained when as much as 50 per cent. crude clay was properly mixed with the rejects, therefore provision was made to add this crude clay to the rejects and thereby maintain the maximum capacity of all units in the several steps in the process. It is this combining of the dry process and the wet process in a single continuous process, that has made an important advance in the clay processing industry, because of the possible low cost operations resulting from the combination and coordination of the two processes, and improvement in both, partly due to their cooperation, resulting in the saving of clay which has heretofore been wasted.

It is easy to dry and pulverize the water washed clay; and if it is mixed with the stream of finished air separated clay, it may be shipped to the consumer, and will fulfill all the requirements. The quality of the clay is also much improved, and it is possible by this method to produce at a reduced cost better clay than has heretofore been made.

The problem of combining the dry and wet treatments in one continuous process presents many angles and involves difficulties which must be solved in order that the process can be carried on in such a manner that substantially pure kaolin can be produced from the raw clay containing impurities of various kinds, weights and sizes, at a cost which will enable the producer to market his output. This cost is a most vital factor, and involves the difference between successful operation of the plant and absolute failure. Among the problems involved are the proper division of the rejects of air separation containing a large percentage of pure clay, the manner of feeding these rejects to the wet and the dry systems of the process, the introduction of them at the proper point and in proper quantity into the partly treated clay in each system and the continuous handling of the stream of material passing through both systems and the regulation of the stream in both systems so as to control both speed and volume, so that in neither of them will there be any blocking or piling up of the material or interruption of the treatment. The volume and production must also be such, despite the varying character of the successive treatments that the total output will carry the entire cost of plant operation plus a profit.

With this end in view, the air treatment is carried on in the present process to a point where a large percentage of the fines are recovered in marketable form, but without carrying on this treatment beyond economical limits, while at the same time reducing the rejects to a state in which they will have their proper proportion when mixed in proper quantities with fresh partly treated clay to not only permit efficient treatment of the mixture, but to render such treatment more effective. To this end the clay is passed through a sequence of air treatments, in the manner herein described, and the net resulting rejects passed through an air treatment which merely separate them without carrying off the fines, so that the lighter rejects will go back into the dry air treatment system and the heavier into the wet system, about to be described, where each is mixed in such a manner and in such proportions with the incoming stream as to produce the desired result. Thus, the air treatment is employed in such a way as to prepare the rejects for further dry and wet treatment, and at the same time recover a large percentage of the fines. This treatment leaves only pure kaolin in larger particles and combined with grit and other impurities. This material is then passed through an air treatment which scavenges it, or, in other words, separates from the mass of rejects air separable fines and lighter, finer impurities, passing them to the dry air system, and passing the remainder of the rejects to the wet system. Just why this division and distribution of the rejects improves and renders more efficient both dry and wet treatments, has not been determined with certainty, but that it does this has been amply demonstrated; and in this an important discovery was involved. Several theories to account for this have been advanced, but they need not be discussed, since we are here dealing with practical results and not with theories.

The wet treatment

In order that the novel features and advantages of the wet treatment stage of the present process may be fully understood, brief reference to the earlier practices of the art—still commonly used—should be made. After mining the clay and crushing it to reduce it to small pieces, as in the dry process, usually by running it between rolls of different diameter rotating at different speeds, the smaller roller having bars running horizontally across its face to break up and feed the clay between the rolls, the clay is fed to a blunger or mixer, which is often a single horizontal shaft with radial and mixing blades thereon rotating in a cylinder or trough through which the shaft extends, the cylinder being supplied with water to disintegrate the clay and separate it from its impurities, with the assistance of the blades.

This mixture then flows from the blunger as a "slip" containing from 5 to 10 per cent. solids and is pumped to troughs known as "classifying launders" where the clay continues in suspension with its lighter impurities. The slip is then caused to flow to long settling troughs, commonly 12 to 36 inches wide and 10 to 20 inches deep and having riffles or similar devices to detain and trap the sand and grit. The troughs are usually arranged in parallel groups, and the aggregate travel of the slip through them is usually from several hundred to thousands of feet, depending upon the fineness of the product desired and the character of the impurities. The grit and other heavy impurities are removed from the troughs at intervals by shoveling or pushing the sediment out through openings conveniently located along the sides of the trough, and the flow is usually stopped during this operation, which results in great loss of time, and involves considerable labor. It also tends to stir up the slip and float lighter impurities.

The slip flows from these troughs over a roughing screen, and sometimes through screens of fine mesh, to remove the foreign objects that have floated along with it, and also mica, pieces of kaolin and hard particles such as feldspar larger than the standard set for the finished product. The slip is then flowed into large settling tanks, where it is allowed to stand until the clay is separated by sedimentation and settles to the bottom. Slip is run into these tanks so long as clear water flows over the top, or through a pipe having its inlet just above the top of the clay level, until the settling has progressed to the point where the slip is 25 to 30 per cent. solids, when the settling is interrupted and the slip drawn off and passed to filters, where as much of the water as possible is extracted in preparation for the final drying. Usually a number of settling tanks or vats are employed, so that the settling can proceed in one or more while one tank is being emptied.

Filter presses are employed in the filtering process, and usually reduce the moisture content to between 28 and 34 per cent., leaving the filter cakes from 66 to 72 per cent. solids. A filter press commonly used, consists of from 60 to 110 cast iron plates or frames of spider-like form hollowed in on both sides and having a hole in the center, and these plates or "leaves" have lugs on opposite sides and rest on a pair of horizontal bars, along which they can be moved during the cleaning and dressing operations. Over each leaf there is fastened a canvas bag or cover with a hole in the center. Inside the space between the canvas are holes through the bottom edge of the cast iron leaf, and around the inner edge of each leaf is a groove leading to the holes, which serve to carry off the water forced through the canvas by pressure pumps while the filter press is closed. The spaces between the interior recessed or hollowed portions of the leaves are filled with solids as the water is forced through the canvas, so that cakes of clay are formed; and these cakes can only be removed by opening the press—usually closed by a screw jack at one end—sliding the leaves along the bars to separate them and causing the cakes to drop out onto a small car in which they are conveyed to a drying tunnel. After this the press is closed again and is ready to receive more slip. This is also an intermittent operation, and involves the work of skilled operators trained to do the work quickly and efficiently.

The disk-like cakes are now wheeled in the little cars to the final drying unit which may consist of a tunnel into which the cakes, separated by racks, are moved on small cars, and in which they are held along enough for the moisture to be evaporated by the heat of the tunnel, while the air is blown through the tunnel and between the cakes by fans. Sometimes racks composed of stationary steam pipes, holding the cakes, are employed, and sometimes the cakes are placed on wooden racks and allowed to dry in the atmosphere. After the drying operation, the cakes are collected by hand, wheeled to and crushed in rolls similar to those first described.

The foregoing outline typifies the usual method or procedure in a clay washing plant. Sometimes chemicals are added to flocculate and to deflocculate the clay, to bleach it, to settle it and to color it, sometimes screening is carried to a "fine point" sometimes pulverizing is stressed, but the methods are all similar and up to the present have been more or less crude, slow and expensive, involving excessive labor and much loss of time.

The features of the present improvements in the wet process per se may be summarized as follows:

1. The feeding of the raw clay or clay bearing material has always been to the blungers or mixers either by hydraulic mining, by elevator or pump; or by wheelbarrows to the crusher rolls and blunger. To avoid having a varying solid content in the slip, hence an unequal settling out of the heavy waste material, and poor regulation of grit content in the finished product, a regulated water feed has been introduced into the incoming mechanically fed uniform clay stream so that a constant volume of water is maintained to the blunger to keep the slip at a uniform specific gravity. This step alone assures even settling out of heavy particles and prevents surges of first thin slip and then heavy slip passing to the classifiers.

2. The blungers usually used are of a heavy type requiring considerable horsepower and not always doing good blunging work. Where wet pans or forms of Chilian mills, or the like, are used the horsepower required is excessive, the investment high and the output per unit low. Therefore an efficient small clay-water mixer may be used, and the slip permitted to overflow from this mixer and passed to the next unit.

3. The old method is wasteful in the classification, or rather, in the effort of separation of suitable clay from foreign materials, and from 15 to 35 per cent. of the clay mined is discarded in the troughs, depending on the fineness of product desired. This is clay, not the grit, sand or other materials, which may add as much as 3 to 60 per cent. more to the discard from the material mined or salvaged in the mine. It is this large percentage of perfectly good clay heretofore wasted that the present method has been able to save, in a simple process of continuous operations.

In the new process instead of using a slightly funnel shaped bowl, with rotating rakes drawing the heavy particles to the center, with a Dorr classifier removing the heavy grit and returning the clay, a flat bottom tank—preferably thirty feet or more in diameter—is used with the rake motion reversed, so that the solids are moved outward toward a pocket near the periphery of the tank, where the heavy particles drop into a regular classifier. The cleansed slip overflows around the upper edge of the tank into a peripheral launder to screens and to thickeners for dewatering. The new step in the process is essentially in slowly raking or sweeping the heavy particles along the bottom of the body of slip to its periphery without the aid of gravity while permitting the liquid containing the lighter pure clay to overflow at the upper edge of the body. In this way the vertical movement of the liquid body is reduced to a minimum, and the settling out and removal of the heavy impurities promoted, since no currents counter to the slow rotary movement of the liquid are set up to cause agitation, and the heavy impurities are constantly swept away from the central slight vortex.

4. A thickener is next used to do away with the settling tanks or vats; and like the classifier carries on a continuous operation. The clay, settling in the thickener tank, is raked to the center and removed continuously, while the relatively clear water overflows the outer edge of the top of the tank into a peripheral launder and to a collecting tank for return to the water system.

5. This continuous flow of thickened slip permits and requires a continuous filtering process which is the next step in the new process.

6. This step may utilize an Oliver "super thickner" for a preliminary treatment the object being to thicken the liquid with 25 to 30 per cent. of solids, up to about 40 per cent. solids before feeding it continuously to the next step, which employs an Oliver continuous vacuum filter. The Oliver super thickner referred to, and which has been designed and arranged to carry out this step comprises a large drum with filter cloth covering the open frame of its periphery, rotating and submerged in a vessel, provided with an inlet for the slip to be thickened, at its upper part, and an outlet for the thickened slip or "sludge" at its lower part. The drum is provided with suction in its interior—preferably through its axis—and as it rotates in the liquid in the tank, the water is filtered through its periphery, any sludge adhering to the peripheral filter cloth being scraped off by a stationary scraper edge near the bottom. As the slip reaches the bottom of the vessel it is drawn off through a conduit, provided with a worm conveyor or the like, and the water in the interior of the drum is drawn off through the axis.

7. The final or the entire filtering operation may be performed by what is known as an Oliver vacuum filter, combined and arranged to cooperate with other devices and designed for the purpose of carrying out this step, the essential features of which are (a) the heating of the sludge to a temperature above 100° F. and below the boiling point of water, (b) the filtering of this sludge to remove approximately 70 per cent. of the water, (c) the removal of the cake of kaolin from the filter and deposit of the same on a conveyor for discharge from the mechanical dehydrating system, and (d) the heating and drying of the cake during the last two operations and the carrying off of the vapor escaping therefrom, the entire operation being carried on continuously and the heated air and other gases carrying off the vapors being utilized in the first operation and thereafter carried off to a condenser in which the vapors are converted into water for use at the blunger and Clabowl along with the condensing water, so that but a small fraction of the heat employed is wasted.

In this set of operations the sludge or thickened slip containing about 40 per cent. of solids is preferably passed to the top of a cylinder with a funnel shaped bottom outlet and with baffles between the top and the bottom which cause the slip to fall therethrough in the form of successive cascades. In the funnel shaped bottom is a hot air inlet and at the top of the cylinder an outlet, by means of which the heated air and other gases, coming from the filter are passed upwardly through this preheating cylinder while the slip cascades pass down therethrough, the said air and gases passing to a condenser, and the heated slip or sludge passing to a vessel having therein a rotary filter drum, similar to the drum of the "super thickner", and also having internal suction and provision for water removal. In this case, the vessel should extend to a point not above the axis of the drum, and the slow rotation of the drum and suction are regulated to keep the level of the thick liquid below the top of the vessel, and an overflow leading back into the unfiltered clay stream is preferably provided at this elevation to maintain the proper level. The cake formed on the periphery of the filter drum—which may be of any suitable and well known form—will be raised from the body of liquid being filtered as the drum rotates and is then subjected to the heating and drying action of hot gases from a suitable furnace, which are caused to pass thereover (see flow sheet). It is then removed continuously from the drum, preferably by air pressure applied to the underside of said cake, and conveyed away from the filtering apparatus, through a tunnel dryer, while still being subjected to the hot gases, and to a disintegrator if desired. The hot gases from the furnace are passed continuously through the drying tunnel, over the top of the filter drum and cake thereon and then to and through the preheater while the slip is cascading down therethrough. It has been found that air at a temperature of about 250° F. passing from the drying tunnel or a furnace (the tunnel may be 75 feet in length) to the filter hood can arrive at the filter hood at a temperature of approximately 200 degrees, when the fan is regulated for a proper speed and volume—in the apparatus in mind approximately 1700 cubic feet per minute. The tunnel may be approximately 48 inches in horizontal and 64 inches in vertical diameter, and the annular space between the hood and the filter is about five inches, the conduit between the hood and the preheater and the exhaust at the top of the latter each being a pipe about one foot in diameter, and the preheating cylinder about 48 inches in diameter. A two inch inlet pipe for the thick slip at the top of the preheater and a four inch outlet between its bottom and the vessel of the filter and a one inch clearance between the vessel and the periphery of the filter drum have been found satisfactory in this arrangement. This contemplates a drum about 14 feet in diameter and 16 feet in length making one revolution in twelve minutes. The outlet to the conduit between the hood and the preheater should be branched or enlarged to permit the gases to pass freely therethrough.

The heated air from the hood in this arrangement will reach the preheater at about 190° F., and the length of the cylinder should be about five feet, without including its conical ends, with baffles in the interior to break up and retard the gravitation of the slip to such an extent that it will be raised in its passage from normal summer temperature to from 130 to 140° F.

The cake is removed from the filtering periphery of the drum by means of air pressure directed against the inner side of the covering of filtering material—which may be of any suitable character—and therefore against the inner side of the filter cake, assisted by suitable scrapers or removing rolls on the outside of the filter layer to constantly separate the cake from the filter and permit it to gravitate to an open belt conveyor in the tunnel, through which it passes in a direction counter to the blast of heated gases passing therethrough, so that it is exposed on both sides to the heating and drying action of these gases.

The suction in the interior of the filter cylinder is maintained beneath the liquid level in the vessel and above that level on the ascending side of the cylinder, which is the side next to the slip inlet of the vessel and the heated gas outlet of the hood, so that after the cake has been formed on the periphery of the cylinder in the vessel it is carried up under the hood and for a time subjected to suction to remove some of the water remaining therein and hold it in contact with the filter. The suction may be thus maintained throughout a part of the circumference of the drum by means of a regulating valve which controls the air in successive cylinder sectors having their open intake sides next to the inner surface of the drum periphery, and the compressed air blast for removing the cake may be applied by means of the same regulating valve through separate ports and actuated when the several sectors approach the horizontal diameter of the cylinder on the descending side, and air jets applied at that point. It has been found that the filter cake, which is approximately ⅛ inch thick, can be removed very effectively by means of air pressure on the inside and a mechanical scraper on the outside. This cake together with clay particles lodged in the meshes of the filter, in the apparatus employed, is approximately 70 per cent. solids and 30 per cent. water. This is made possible by the preheating of the thick slip before passing it to the filter and the further heating and drying of the cake while it passes up and around under the hood. The heating of the slip accelerates filtration of the water, tends to keep the filter meshes clear and to prevent too close adherence of the solids to the filter, while the heating of the cake above the liquid level not only dries the cake and renders it more firm in consistency, but makes its separation from the filtering medium easier.

8. Instead of having a conveyor to carry the filter cake through the 75 foot tunnel, it may be discharged directly, or by means of a short belt to any suitable dryer for the removal of the remaining moisture therein, and in this case the tunnel may be a short one. If the long tunnel and conveyor are used, however, they constitute what may be called means for carrying out the eighth step in the treatment and result in drying the cake from approximately 30 per cent. of moisture down to as low as ½ of 1 per cent. moisture content.

9. If desired, or found advisable, due to the cohesive and non-friable character of the clay cake, the cake may be passed to the final dryer through a feeder consisting of a cylindrical casing tapering toward its discharge end from say 18 down to 12 inches in diameter and having an axial rotating shaft therein carrying blades which cut up the filter cakes as they pass therethrough and move them toward the outlet, and a single screw auger-like member near the outlet and substantially filling the bore of the casing to force it through the outlet, where a flat rotary cutting die cuts and slices it as it issues therefrom to the dryer.

This final dryer for the disintegrated cake may be a Christie vacuum indirect heat dryer or a Nichols dryer, both of which are well known and used for drying other materials, and discharge the now thoroughly dried pure clay to crushing rolls similar to those first described, or other means for breaking up any lumps that may remain therein. After this has been done, the clay is passed to storage bins or railroad cars for delivery to the consumer.

It will be understood that the tunnel drying, discharging, feeding and final drying discharging and crushing steps, last described, like all the other steps in the process are continuous and are coordinated so as to operate in harmony with and supplement the earlier steps, and to handle the material with such speed and in such quantity as to avoid any delay or interruption of the entire continuous process.

In the foregoing description, various mechanisms have been referred to, and some of them have been described somewhat in detail. Description, however, has only been given where special features have been employed to carry out the present process, and in order that users of the process may have ample information to enable them to carry it out, by means of mechanisms, to best advantage. Such apparatus, however, may be varied, or other apparatus may be substituted therefor; and the present method or process invention is not limited to any particular apparatus or form thereof, since it is obvious that any apparatus suitable for carrying it out may be employed.

One of the features of the present process is that the heated air and other gases and heated water systems are so arranged that they can be operated from central plants, at which heated air and water are produced and to which the partly cooled air and water returns, so that the heat units—which represent fuel consumed and heating plant overhead—are not wasted and the water is not wasted. In carrying out this part of the process, the water from the water supply is mixed with the return water from the thickeners, the filter and the condenser. This is arranged in the following manner: Fresh water is supplied to the condenser, passing from the condenser with the water condensed therein to a return water conduit, to which the clear water from the thickeners, and filter also flows. This condenser recovers the vapors from the vacuum dryer and preheater, and supplies water to the blunger and classifier to be mixed with the crushed raw clay in the former and with the slip passing to the latter from the blunger, thus completing the cycle. The heated gases generated at the hot air furnace for the belt tunnel, filter and preheater and the gases from the vacuum dryer, which is provided with a heater, after passing through the tunnel may be passed back if desired to the furnace and used over again, or may be used for heating the slip between the super thickener and the filter, in the preheater, and after that sent to the condenser. By connecting this hot air supply with the rotary dryer vent of the dry system, a complete hot air circulation for the entire combined systems may be provided, and the relative temperatures at each point where heated gases are applied controlled by the furnace fan which determines the speed, volume and pressure and incidentally the initial temperature of the furnace output of heated gases.

*Combining features*

After the crude clay has been air dried and crushed in the rolls, thoroughly dried in the rotary dryer and disintegrated in the cage mill, of the dry treatment phase of the process, the stream of clay is pumped to a pair of (Gayco) or other air separators at a considerable elevation, and split so that half the stream is fed to each. In carrying out this stage of the process, the two Gayco separators have been so regulated that each will separate out and recover about 25 per cent. of the clay as fines, passing on as rejects about 75 per cent. of the clay and the impurities to a third Gayco separator, where about ⅙ is recovered as fines and the balance or about ⅚ passed to a fourth Gayco separator, set to recover about ⅕ of the pure clay and passing about ⅘ to the next or fifth Gayco separator in which about 25 per cent. of the fines are recovered and the balance or 75 per cent. passed on to the final Gayco separator, which acts to divide these rejects, and is called a "scavenger". Thus, of 245 tons fed to the first pair of separators during a given period 185 tons will be passed on to the third separator and 60 tons to the pure clay bins or cars for delivery to the consumer, thirty tons will be recovered in the third separator and 155 tons rejected, 30 tons recovered in the fourth and 125 rejected and 30 tons in the fifth with 95 rejected. This operation is continuous, and the clay is passed from each air separator in the series to the next, by gravity or by worm conveyors or pumps working constantly.

The sixth air separator or "scavenger" is set so that the rejects—containing a large percentage of pure clay—are split up, a part of them, with the lighter and finer impurities, being recovered through the outlet for fines and a part going through the outlet for rejects. In practice, the 95 tons, or rejects, passed to the scavenger have been divided so that 45 tons are discharged therefrom through the pure clay outlet and 50 tons through the outlet for rejects, both portions containing a very large percentage of pure clay.

These divided rejects from the scavenger are fed to the dry and the wet treatment phases of the process as they come from the scavenger, so that 45 tons will pass to the dry stream while 200 tons are passing therethrough, making 245 tons in all. The scavenger, however, is so regulated that these rejects have about the same percentage of impurities as the raw clay, and tests have indicated that they can be added to the untreated clay stream at a rate which will cause them to constitute as much as 50 per cent. of the stream, without impairing the air separating operation. The rejects are fed to the dry stream between the disintegrator and the first air separators, and are preferably pumped up to the said separators with the remainder of the dry stream by a Fuller Kinyon or other similar type of pump, these pumps being provided at various points in the system where needed, and their capacity regulated to give the required volume and rate of flow in the dry system.

The remaining rejects discharged by the scavenger, which contain the heavier impurities are passed to the blunger of the wet system through a conduit in which there is an open vessel or "cascade" receiving these rejects and also a quantity of water from the return water conduit, and in which the two are mixed in about the same proportion as the raw clay and water in the blunger. They, therefore, enter the blunger as a liquid with entrained solids of about the same consistency as the mixture in the blunger. Here again the rejects may be injected into the wet phase, so that they will constitute as much as 50 per cent. of the solids in the stream, but in order to secure the maximum output a much larger quantity of raw clay than of rejects is fed to the blunger, the former constituting as much as ⅘ of the solids, the quantity of clay fed to the wet phase of the process being at all times the maximum quantity that can be taken care of by it. It has been found that the addition of these rejects to the wet phase does not in any way impair the speed or efficiency of it, but will actually make it more efficient. Various theories to account for this have been advanced; e. g., that the presence of mica and similar impurities in the settling stage tends to comb out and accelerate the precipitation of impurities, and that the presence of heavier impurities, such as sand, renders the precipitated impurities heavier and more compact and therefore more easily removed by the rakes and the traps into which they fall by gravity, from the bottom of the classifier. The fact remains, however, that the added rejects improve the efficiency of the operation of removing impurities.

The process described proceeds continuously, raw clay being supplied thereto constantly in regulated quantity and pure clay and impurities being discharged therefrom continuously, so long as the plant is in operation. Substantially 100 per cent. of the pure clay is recovered and substantially 100 per cent. of the impurities eliminated.

It will be understood that variations in the process herein described and claimed and in the steps thereof may be made, within the purview of the claims, without departing from the scope of the invention, and that such variations will be required by the character of the clay to be treated and its impurities and by other conditions, and further that while the foregoing description sets forth an embodiment of the process productive of excellent results in the treatment of certain clays in connection with which it has been used the skill and intelligence of those skilled in the art must be exercised in applying the process to varying local materials and conditions. Thus it is not in all cases necessary or advisable to split the rejects of the air treatment, and such rejects may be passed wholly to the wet treatment, and without passing any of them through the dry air treatment. In some cases, also, it may be found necessary to store up materials in the course of treatment, as in the dried clay storage bins between the dryer and the pulverizer indicated in the flow sheet and described in the specification, or to convey the materials to a more or less distant point for wet treatment, as where a wet treatment plant has been set up at such distant point or a sufficient water supply in proximity to the source of raw material is not available. Such operations are to be regarded as continuous within the meaning of the description and claims hereof, except where otherwise specified in the said claims, and will enable the user of the process and the various steps thereof to realize most of its advantages with perhaps less efficiency of operation.

I claim:

1. The method or process of separating clay from its impurities and recovering the substantially pure clay which consists in disintegrating and drying the clay with its impurities, then air separating a portion of the pure disintegrated clay from the impurities, then splitting the remaining body of clay with contained impurities into lighter and heavier portions then mixing one portion with unseparated clay and air separating the said mixture.

2. The method or process of separating clay from its impurities and recovering the substantially pure clay which consists in disintegrating and drying the clay with its impurities, then air separating a portion of the pure disintegrated clay from the impurities, then again air separating and then splitting the remaining body of clay with contained impurities into lighter and heavier portions then mixing the lighter portion with unseparated clay and air separating the said mixture.

3. The method or process of separating clay from its impurities and recovering the substantially pure clay which consists in disintegrating and drying the clay with its impurities, then air separating a portion of the pure disintegrated clay from the impurities, then splitting the remaining body of clay and impurities into lighter and heavier portions then mixing one portion with unseparated clay and air separating the mixture and blunging and washing the other portion to remove its impurities.

4. The method or process of separating clay from its impurities and recovering the substantially pure clay which consists in disintegrating and drying the clay with its impurities, then air separating a portion of the pure disintegrated clay from the impurities, then splitting the remaining body of clay with contained impurities into lighter and heavier portions then mixing one portion with unseparated clay and air separating the said mixture, the operation being carried on continuously on a constantly moving stream of unseparated and partly separated clay and without interrupting its flow.

5. The method or process of separating clay from its impurities and recovering the substantially pure clay which consists in disintegrating and drying the clay with its impurities, then air separating a portion of the pure disintegrated clay from the impurities, then splitting the remaining body of clay and impurities into lighter and heavier portions then mixing one portion with unseparated clay and air separating the mixture and blunging and washing the other portion to remove its impurities, the operation being carried on continuously on a constantly moving stream of clay and without interrupting its flow.

6. A continuous method of treating clay to separate it from impurities which consists in disintegrating, drying and air separating a part of the clay from its impurities and washing rejects of the air separation containing pure clay and thus recovering substantially the balance of the pure clay therefrom.

7. A continuous method of treating clay to separate it from impurities which consists in disintegrating, drying and air separating a part of the clay from its impurities and washing the rejects of air separation containing pure clay and thus recovering substantially the balance of the pure clay therefrom, these operations being carried on successively on a constantly moving stream of clay.

8. The method or process of separating clay from its impurities and recovering the substantially pure clay which consists in disintegrating and drying the clay with its impurities, then air separating a portion of the pure disintegrated clay from the impurities, then splitting the remaining body of clay with contained impurities into lighter and heavier portions, then mixing one portion with unseparated clay and air separating the said mixture, the portions so mixed with untreated clay being fed to the latter at a rate regulated with respect to the speed and volume of flow of the latter so as to maintain a definite ratio between the two.

9. A method of separating clay from its impurities comprising crushing, uninterrupted blunging, classifying and thickening, to form a thick slip, preheating and filtering continuously to remove water from the slip and produce a cake of clay and then drying and disintegrating the cake, these operations being carried on successively and continuously on a constantly moving stream of material, and without interrupting the flow of said stream.

10. A method of separating clay from its impurities comprising air separating a portion of pure clay from its impurities, mixing the rejects of air separation with untreated crushed clay then blunging, classifying and thickening the mixture, to form a thick slip, filtering to remove water from the slip and produce a cake of clay and then drying and disintegrating the cake.

11. As steps in the separation of clay or the like in a finely divided state containing a thin liquid such as water, heating the mixture to a temperature between 100° F. and the boiling point of water, then filtering out water therfrom, then continuously and as the cake is formed removing the filter cake from the water and subjecting it to the drying and solidifying effect of heated gases passing over it, then removing the filter cake from proximity to the liquid.

12. As steps in the separation of clay or the like in a finely divided state containing a thin liquid such as water, heating the mixture to a temperature between 100° F. and the boiling point of water, then filtering out water therefrom, then continuously and as the cake is formed removing the filter cake from the water and subjecting it to the drying and solidfying effect of heated gases passing over it, then removing the filter cake from proximity to the liquid by applying to the under side thereof air pressure.

13. As an addition to the steps specified in claim 11 conveying the removed cake away from the filter continuously while subjecting it to the action of heated gases, feeding it and subjecting it further to the action of drying and heating gases and disintegrating it while so feeding it, all of the operations of the steps being carried on continuously and successively on a constantly moving stream of material.

14. A method of separating solids, such as clay in a finely divided fluent state from entrained water which comprises heating the fluid to a temperature above 100° F. and below the water boiling point, filtering it while heated and under pressure acting in the direction of the filtering area, removing the separated solids from the fluid and heating, partly drying and solidifying them and then conveying them for further treatment, the said heating and drying being carried on by causing a continuous current of hot gases to pass over the material at the conveying, drying and fluid heating stages successively.

15. The method of separating soil materials, such as clay from their impurities and recovering the substantially pure clay which consists in disintegrating, drying and separating by air flotation and carrying off a portion of the fine pure material from the impurities, then blunging rejects of the air separation with water, then removing impurities by sedimentation, then filtering to remove water from the mixture of clay and water from which said impurities have been so removed, then drying the filtered material by passing heated gas thereover, and returning the filtrate to the blunging stage.

16. A continuous method of treating clay to separate it from its impurities which consists in first disintegrating and drying the impure clay and air separating a part of the pure clay from said impurities and then washing and sedimenting rejects of the air separation containing pure clay and a large percentage of impurities and thus separating the pure clay and recovering it from said rejects.

17. In the method or process of claim 16 the additional step of adding to the rejects prior to the washing and sedimenting crushed and unseparated clay containing impurities.

18. A continuous method of treating clay to separate it from its impurities which consists in first disintegrating and drying the impure clay and air separating the major part of the pure clay from said impurities and then washing and sedimenting rejects of the air separation containing pure clay and a large percentage of impurities and thus separating the pure clay and recovering it from said rejects and impure clay.

19. A method of treating clay to separate it and its impurities, which consists in disintegrating, drying and reducing it with its impurities to a finely divided state, then subjecting the same to the action of air currents and centrifugal force to separate and remove by air flotation clay uncombined with impurities and retain impurities combined and associated with clay, then blunging in a liquid said impurities and clay not so removed, separating the clay from the impurities and floating it in suspension in the liquid and decanting the same and sedimenting and carrying off the impurities, then thickening the decanted liquid carrying the clay and then filtering out the liquid and drying the clay from which the liquid has been filtered.

20. A method of treating clay to separate it and its impurities, which consists in disintegrating, drying at a temperature above normal atmospheric temperatures and reducing it with its impurities to a finely divided state, then subjecting the same to the action of air currents to separate and remove by air flotation clay uncombined with impurities and retain impurities combined and associated with clay, then blunging in a liquid said impurities and clay not so removed, separating the clay from the impurities and floating it in suspension in the liquid and decanting the same and sedimenting and carrying off the impurities, then thickening the decanted liquid carrying the clay and then filtering out the liquid and drying the clay from which the liquid has been filtered.

21. A series of steps in a process of separating finely divided floatable solids from a thick slip or sludge composed of said solids and a major percentage of water, forming said solids into a cake, drying the cake and removing it for further treatment, which consist in cascading the said slip and passing it into a vessel, continuously filtering therefrom in said vessel a portion of the water and causing the solids to form a cake on the filtering device, moving said filtering device and thus removing the cake with a minor percentage of water from said slip and then removing said cake from the filtering agency, and adding more slip to said slip in the filtering vessel and carrying off the filtrate continuously and while passing a current of air heated above normal atmospheric temperatures over said cake as it is removed from the slip and as it is removed from the filtering agency and further passing said current of air over the slip cascading and before it passes into the filtering vessel.

DAVID F. McCORMICK.